Dec. 10, 1963  J. RICHTER ETAL  3,113,847
MANUFACTURING LINE FOR SHOE MANUFACTURING
Filed May 17, 1961  3 Sheets-Sheet 3
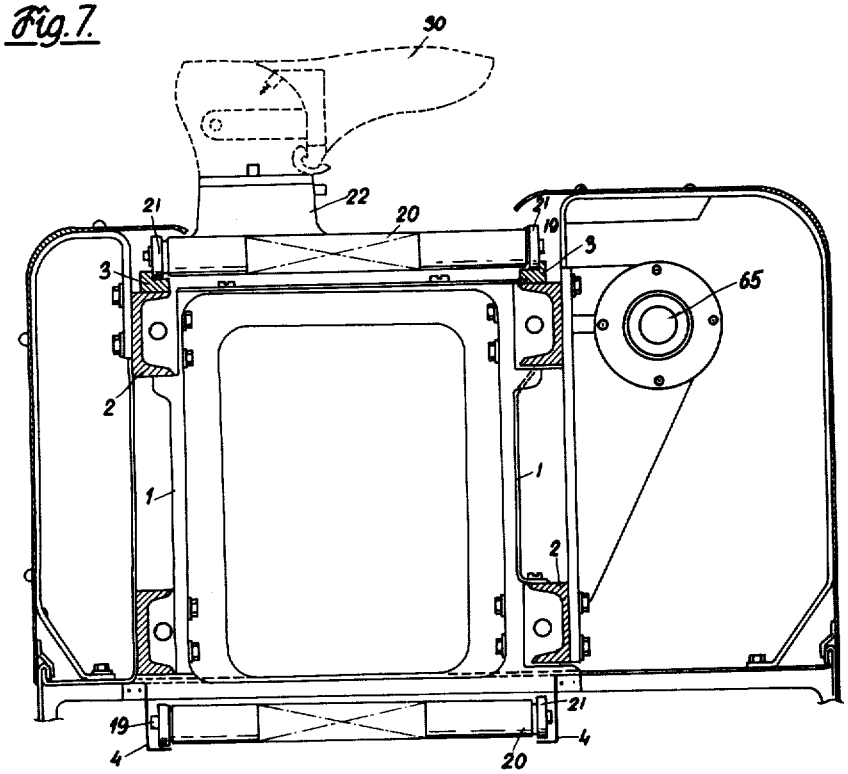
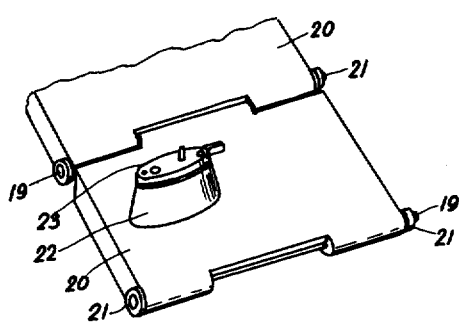
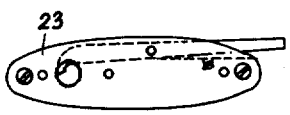
INVENTORS
Jiří Richter, Karel Černoch
BY
Richard Ernst agt United States Patent Office 3,113,847
Patented Dec. 10, 1963

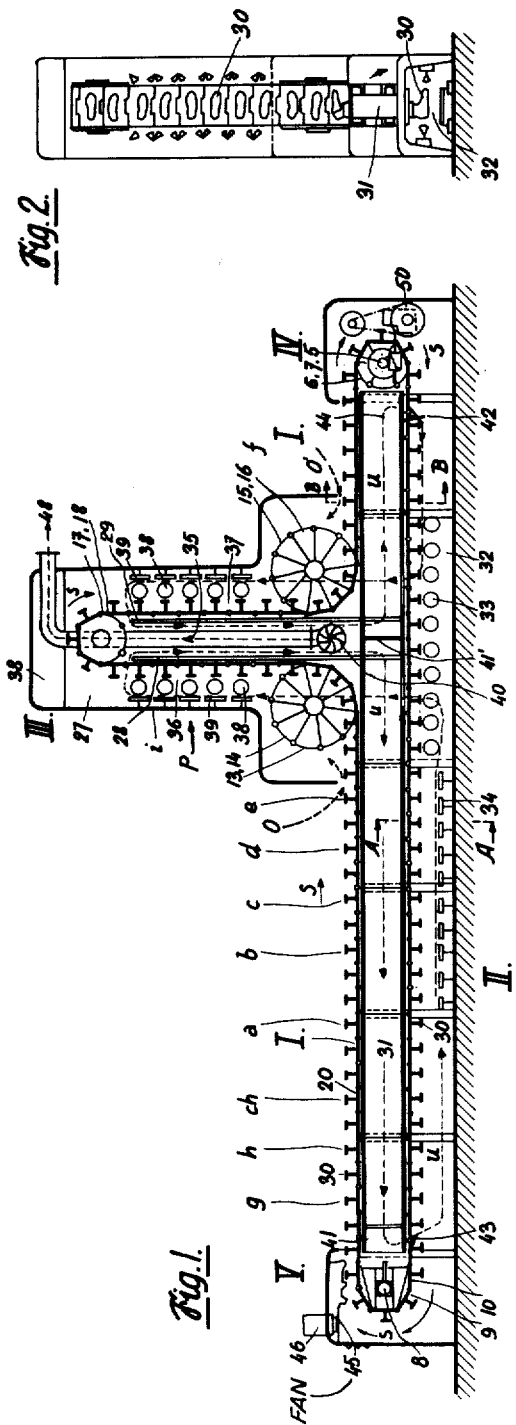

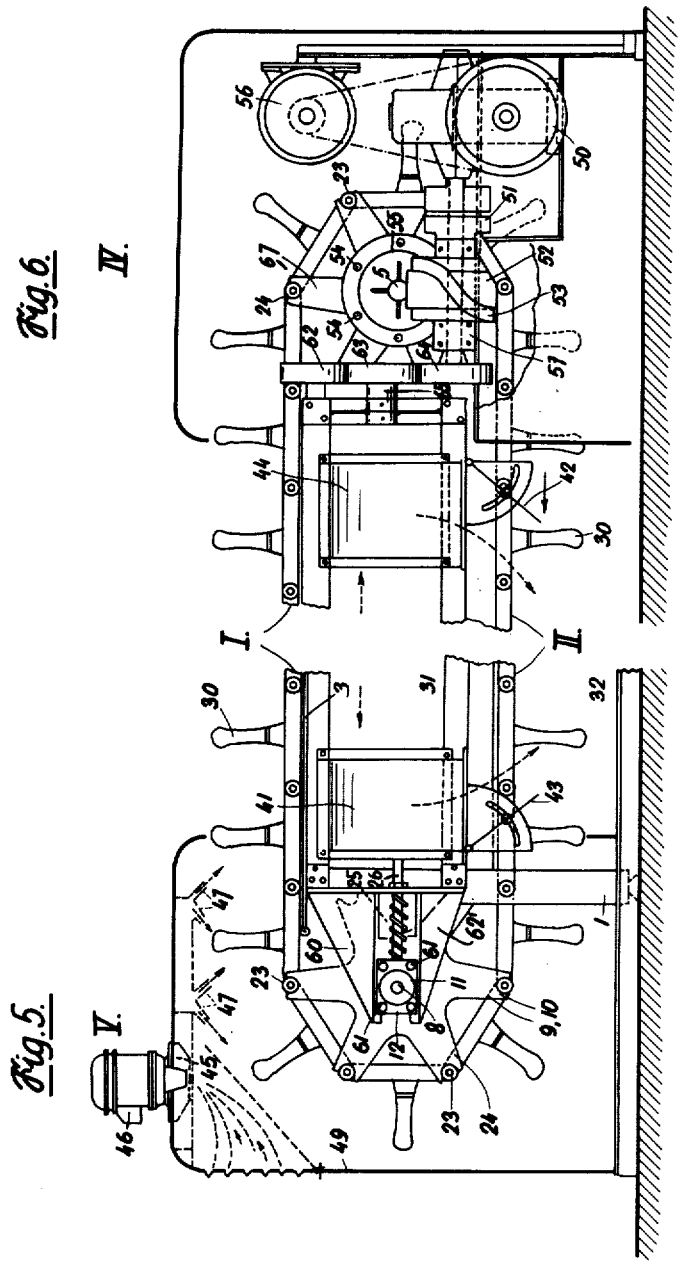

3,113,847
MANUFACTURING LINE FOR SHOE
MANUFACTURING
Jiri Richter and Karel Cernock, Gottwaldov, Czechoslovakia, assignors to Svit, narodni podnik, Gottwaldov, Czechoslovakia
Filed May 17, 1961, Ser. No. 125,297
Claims priority, application Czechoslovakia May 28, 1960
3 Claims. (Cl. 34—68)

The present invention relates to a manufacturing line enabling a continuous mass production of shoes with an upper of leather or fabric and with a leather or rubber sole, using exchangeable lasts fixed firmly to a conveyor chain.

At present shoes of different kind are manufactured on independent and rather complicated manufacturing machines, placed according to the kind of shoe to be manufactured along an independent conveyor belt, which arrangement however appears inadequate at the present time.

A drawback of the present manufacturing equipment for ladies' shoes is the need for a large number of lasts of all sizes. Thus the first and maintenance costs are substantial. The manufacture of ladies' shoes also requires higher first, maintenance and storage costs for form pieces used for the vulcanisation of soles to an upper of leather or fabric.

It is an object of this invention to eliminate these drawbacks and to provide a shoe manufacturing line whereby the major part of the operations is performed on a single conveyor assembly including the drying and stabilisation of the shape of the upper, mounted on the last, within a substantially reduced time. The manufacturing line according to this invention is composed of five main parts, two of which are horizontal conveyor runs arranged one above the other, with two venting channels below the upper run arranged one above the other, whereby the lower channel is provided with infra-red radiators and electric radiating bodies. The upper conveyor run is caused by three pairs of guide sprockets to change its course to a vertical section which is divided by partition walls into three venting channels, with ventilation produced by one common ventilator and also provided with infra-red radiators and electric radiating bodies. The vertical section returns to and moves on in the horizontal plane. The conveyor chain is endless and composed of plate shaped elements linked together by bolts passing across the whole width of these elements. All operations beginning with the mounting of the upper on a last, including the drying and stabilisation of the upper stretched on the last are performed on the conveyor chain.

The specification is accompanied by drawings in which:

FIG. 1 represents a schematic view of the manufacturing line according to the invention, FIG. 2 a schematic side view of the conveyor shown in FIG. 1, FIG. 3 a view of a conveyor element in the direction of the arrow "P" in FIG. 1, also showing infra-red radiators and electric heat radiating elements, FIG. 4 a cross section in the plane A—A of FIG. 1 through the lower part of the conveyor with a conveyor element including a last, infra-red radiators and electric heat radiating elements, FIG. 5 a schematic view of a tensioning station of the conveyor and of an arrangement acting on adhesive applied upon parts of the shoes, FIG. 6 a schematic view of a driving station of the conveyor, FIG. 7 a cross section through the conveyor in the plane B—B in FIG. 1, FIG. 8 a perspective partial view of the connection between two conveyor links, FIG. 9 a top view of a device fixing the interchangeable lasts on the conveyor chain elements.

The arrangement of the manufacturing line according to FIG. 1 comprises a continuous conveyor which includes an upper horizontal conveyor part I, a lower horizontal part II, a vertical part III, whereby both horizontal parts I and II terminate at one end in a driving station IV and at the other end in a tensioning station V.

On the frame 1 of the conveyor (See FIGS. 1, 4, 5, 6 and 7) provided with lateral supporting profile irons there are the upper guide rails 3 and the lower guide rails 4 of the conveyor chain. A rotatable shaft 5 with sprocket wheels 6, 7 fixed on its ends is supported at one end of said frame 1.

At the other end of the frame in the part V a tensioning device 60 for the conveyor chain is arranged, on the shaft 8 of which sprocket wheels 9, 10 are fixed, the shaft 8 being supported in bearings 11. The bearings 11 are arranged within slidable blocks 12 on brackets 62'. In case the conveyor chain has to be tensioned, the blocks 12 are moved by means of screw bolts 25, 26 over springs. The tensioning device is covered by a cover 49 which is a part of a conveyor housing. On the inside of the cover 49 there is a fan 45 which is driven by an electric motor 46 shown to be above the cover 49. Air sucked in by a fan 45 through passages 47 acts on the hot layer of adhesive previously applied to the lower part of the uppers stretched on the lasts 30.

The frame 1 is provided in its upper part with a vertical extension III of the conveyor. There are three pairs of guiding sprocket wheels 13, 14, 15, 16 and 17, 18 in this part of the conveyor, which are determining the path of the upper run of the conveyor chain. The conveyor chain is composed of plate shaped elements 20 pivotally linked by bolts 19 passing across their full width. Each element 20 is provided with an extension 22 and a device 23 for fixing the lasts 30. Each last 30 is firmly fixed to an element 20 without the possibility of any turning, but it can be exchanged for some last of other shape or dimension. Both ends of the bolts 19 are devised so as to allow easy movement of the conveyor chain along the guide rails 3, 4 of the frame 1 and to enable the transmission of the driving force over indentations 24 of the sprocket wheels 9, 10, 6, 7, 13, 14, 15, 16.

The conveyor chain arcuately passing over said sprocket wheels represents a closed circuit which includes both horizontal terminal parts of the upper run I, the lower horizontal run II and the vertical extension III interposed between the terminal portions of the horizontal run. In the space below the upper run I there are venting channels 31 and 32, arranged one above the other. The venting channel 32 below the lower horizontal run II is provided with infra-red lamps 33 and with electric heating elements 34 and represents a drying space. Exit channels 44, 41 with adjustable flaps 42, 43 are provided at both ends of the upper venting channel 31. These flaps control the air passing through the upper venting channel 31 in the reverse direction into the lower venting channel 32 and also into the vertical conveyor part III.

The vertical conveyor part III is enclosed in the cover 27. The inner space of the vertical conveyor part III comprising ascending and descending portions of the conveyor chain guided by the sprocket wheels 13, 14, 17, 18 and 15, 16 is divided by the partition walls 28, 29 into three venting channels 35, 36 and 37 forming a drying space controlled by a ventilator 40 placed in the lower section of channel 35. The space of channels 36, 37 outside the vertical run of the conveyor chain within the cover 27 is provided with infra-red lamps 38 and with electric heating elements 39, constituting a drying medium.

An outlet passage or exhaust duct 48 for the removal of the vapors into the atmosphere is provided at the top of part III. Both the infra-red lamps 38 and the electric heating elements 39 in the vertical part III of the conveyor, and the infra-red lamps 33 and electric heating elements 34 act upon the central parts of the plate shaped conveyor chain elements 20 when they are at rest during the intermittent movement of the conveyor.

Circulation of the hot air in the channels 31 and 32 and in the vertical extension III represents substantially a closed circuit where only a part of the circulating air partly saturated with fumes is discharged through the outlet passage 48 under simultaneous sucking in of fresh air through ports O and O' within the lower part of the cover 27 of part III.

The circulation is achieved by the ventilator 40 which sucks on air partly saturated with fumes from the channels 36, 37 into the channel 35, and discharges a part thereof through to the outlet passage 48. The amount discharged is regulated by throttling means at the bottom of the exhaust duct 48. The remaining part is pressed through passages into the channel 31 where the stream of air is divided by the partition wall 41' into two separate circuits in opposite directions marked by the arrows "U." It is obvious from FIG. 1 that the left hand circuit is longer than the right hand one, and in order to adjust the required conditions adjustable flaps 43 and 42 are provided in the openings 41 and 44 respectively, which connect the channels 31 and 32. The air continues through both parts of the lower channel 32 again in opposite directions over the infrared radiators 33 and heat radiating elements 34. The upper venting channel 31 serves for the distribution of hot air, while in the lower channel 32 the drying of the adhesives applied and the stabilisation of the uppers stretched on the lasts 30 are accomplished. The air is then directed from both parts of the lower channel 32 in vertical direction to both outer vertical spaces 36, 37 within the cavity of the cover 27 passing infra-red radiators 38 and heat radiating bodies 39, reaches the upper space of the extension III, and is drawn through the channel 35 between the partition walls 28 and 29 by the ventilator 40 as above described and pressed again into the channel 31, deviating part of the mixture of air and fumes to the outlet 48.

In the course of movement of the conveyor chain elements 20 along the lower run II within the venting channel 32 the lasts 30 with shoe uppers mounted thereon are turned with their sole parts downwards and are efficiently exposed to the drying effect.

A driving arrangement 50, best seen in FIG. 6, is provided in part IV and comprises an electric motor 56 which drives over a clutch 51 a transmission drum 52. The later is provided with a helical groove 53 into which groove bolts 54 arranged on a disc 55 connected with the sprocket wheels 6, 7 engage. The bolts 54 are moved stepwise by the groove 53 through distances which correspond to the uniform stepwise length of each of the conveyor chain elements 20 supporting the lasts 30.

The rotating movement is further transmitted from the shaft 57 of the transmission drum 52 over toothed gears 62, 63, 64 to a shaft 65 which extends along the horizontal conveyor run I and may be employed to drive non-illustrated machinery at the several working stations $a$ to $f$.

Before the conveyor chain which consists of the chain elements 20 is put into intermittent motion by the electric motor 56 and by the driving elements 50, 51, 52, 53, 54, 57, the lasts 30 on the chain elements 20 are heated to the required temperature. During the intermittent movement the conveyor chain moves in the direction of the arrows S in FIG. 1.

The attendant seizes the upper sewn together with the insole and mounts it upon the last 30 on the operating stand or working station marked in FIG. 1 with the letter $a$.

During the further intermittent movement the upper on the last 30 passes the operating stations $b$, $c$, $d$, $e$ in the upper horizontal run I of the conveyor and the drying space in the vertical part III where the upper on the last is stretched and stabilised due to the radiant heat. The air heated by the infra-red lamps 38 and the electric heating elements 39 is brought into motion in the direction of the arrows U marked in FIG. 1 by the ventilator 40.

After the upper on the last 30 has passed the space provided with infra-red lamps 38 and electric heating elements 39, it continues its motion in the horizontal plane of the upper run I. To the circumference of the insole part of the upper, adhesive is automatically applied in the operating station $f$ for the second time in the same way as in the operating station $e$. During the further travel the upper moves in the direction of the arrow S through the space of the lower venting channel 32 of the lower longitudinal part II of the conveyor where it is equally exposed to the stabilising and stretching action due to the drying effect of both the infra-red lamps 33 and electric heating elements 34.

In the conveyor part V the upper is exposed to the action of the fan 45 which forces the sucked-in cold air against the layer of adhesive applied hot in the working or operating station $f$ to the insole part of the shoe upper. The upper on the last 30 continues its travel in the direction of the arrow S (FIG. 1) and reaches the operating stations $g$, $h$, $ch$, where the shoe is removed from the last 30. In the working station $a$ a new upper is mounted on the last 30 and the whole manufacturing cycle is repeated.

Thus all major operations including the drying and stabilisation of the upper mounted on the last are performed, according to the present invention, within a shorter time, requiring only a limited number of lasts, so that the maintenance and storage of a large number of lasts of different shapes and sizes are eliminated.

This invention ensures a substantially higher output and a higher quality of shoes, with rather reduced first and maintenance costs due to the elimination of presently used independent working machines which according to requirements of the manufacture of shoes had to be changed frequently and placed along an independent conveyor belt.

We claim:

1. A conveyor assembly for a manufacturing line comprising, in combination:
   (a) frame means;
   (b) guide means mounted on said frame means and defining a continuous conveyor path, said path including a lower horizontally extending run, an upper horizontally extending run, said runs having respective terminal portions, each terminal portion being arcuately connected to a corresponding terminal portion of the other run, and a vertically extending extension run interposed between the terminal portions of said upper run, said extension run having an ascending portion and a descending portion;
   (c) a plurality of plate shaped conveyor elements;
   (d) a plurality of bolt means, each bolt means pivotally connecting two of said elements, and the pivotally connected plate elements jointly constituting an endless conveyor chain forming a loop and engaging said guide means for guided movement of said conveyor chain along said path, said bolt means each extending transversely of the direction of conveyor chain movement;
   (e) a plurality of lasts respectively releasably fastened to said plate shaped elements and outwardly projecting from said loop;
   (f) drive means for actuating movement of said conveyor chain along said path;
   (g) housing means defining a lower horizontally elongated channel substantially enclosing said lower run, and an upper horizontally elongated channel interposed between said lower channel and said upper run;

(h) partition means in said upper channel and dividing the same into two longitudinal portions, each of said portions being substantially coextensive in a horizontal direction with one of said terminal portions of said upper run and with a portion of said vertically extending extension run, and also coextensive with a corresponding terminal portion of said lower channel;

(i) cover means defining a cavity;

(j) partition means dividing said cavity into three communicating portions, a first and a second one of said cavity portions respectively receiving said ascending portion and said descending portion of said extension run;

(k) passage means communicating with said channels and said cavity portions to define therewith two continuous conduits each extending from said third cavity sequentially through one of said portions of said upper channel, the corresponding terminal portion of said lower channel, a respective one of said first and second cavity portions, and thence back to said third cavity portion;

(l) ventilator means in said cavity portion for driving a gaseous fluid through said conduits;

(m) exhaust duct means communicating with said third cavity portion for discharging a portion of said gaseous fluid therefrom, each of said conduits being formed with an aperture for admitting ambient air; and (n) heater means in said lower channel and in said first and second portions of said cavity, said terminal portions of said upper horizontally extending conveyor run being outside said housing means and said cover means to constitute a plurality of work stations.

2. A conveyor assembly as set forth in claim 1, wherein said apertures are arranged in said first and second cavity portions respectively and spaced from the heater means therein in a direction away from said third cavity portion.

3. A conveyor assembly as set forth in claim 1, wherein said conveyor elements are of uniform length in the direction of conveyor chain movement, and said drive means includes means for actuating stepwise movement of said conveyor means, each step of the movement corresponding to said uniform length.

References Cited in the file of this patent

UNITED STATES PATENTS

| | | |
|---|---|---|
| 1,885,718 | Hartwell | Nov. 1, 1932 |
| 1,934,835 | Weiss | Nov. 14, 1933 |
| 2,500,352 | Fulton | Mar. 14, 1950 |

FOREIGN PATENTS

| | | |
|---|---|---|
| 842,170 | Germany | June 23, 1952 |

UNITED STATES PATENT OFFICE
CERTIFICATE OF CORRECTION

Patent No. 3,113,847                          December 10, 1963

Jiri Richter et al.

It is hereby certified that error appears in the above numbered patent requiring correction and that the said Letters Patent should read as corrected below.

In the grant, line 1, and in the heading to the printed specification, line 4, for "Karel Cernock", each occurrence, read --- Karel Cernoch ---.

Signed and sealed this 16th day of June 1964.

(SEAL)
Attest:

ERNEST W. SWIDER                           EDWARD J. BRENNER
Attesting Officer                               Commissioner of Patents